United States Patent
Ha et al.

(10) Patent No.: US 6,508,053 B1
(45) Date of Patent: Jan. 21, 2003

(54) INTEGRATED POWER GENERATION SYSTEM

(75) Inventors: Bao Ha, San Ramon, CA (US); Jean-Renaud Brugerolle, Paris (FR); Alain Guillard, Paris (FR); Giovanni Massimo, Limeil-Brevannes (FR); Bernard Saulnier, Colombes (FR)

(73) Assignees: L'Air Liquide-Societe Anonyme a'Directoire et Conseil de Surveillance pour l'Etude et l'Exploitation des Procedes Georges Claude, Paris (FR); Air Liquide Process and Construction, Inc., Houston, TX (US)

( * ) Notice: Subject to any disclaimer, the term of this patent is extended or adjusted under 35 U.S.C. 154(b) by 0 days.

(21) Appl. No.: 09/466,972

(22) Filed: Dec. 20, 1999

Related U.S. Application Data (63) Continuation-in-part of application No. 09/289,286, filed on Apr. 9, 1999, now abandoned.

(51) Int. Cl.$^7$ .............................................. F02B 43/00
(52) U.S. Cl. ................................................... 60/39.12
(58) Field of Search ........................... 60/39.02, 39.03, 60/39.12; 62/650

(56) References Cited

U.S. PATENT DOCUMENTS

| | | | | |
|---|---|---|---|---|
| 5,317,862 A | * | 6/1994 | Rathbone | 60/39.05 |
| 5,740,673 A | * | 4/1998 | Smith et al. | 60/39.02 |
| 5,979,183 A | * | 11/1999 | Smith et al. | 62/650 |

* cited by examiner

Primary Examiner—Charles G. Freay
(74) Attorney, Agent, or Firm—Linda K. Russell (57) ABSTRACT

The present invention relates to an air separation plant integrated with another process. Work is recovered from a nitrogen enriched stream produced by an air separation process either by expanding the nitrogen enriched stream directly or by combustion of the nitrogen enriched stream with a fuel stream and expanding gas produced by the combustion.

17 Claims, 6 Drawing Sheets

INTEGRATED POWER GENERATION SYSTEM

CROSS-REFERENCE TO RELATED APPLICATION

This is a continuation-in-part of application Ser. No. 09/289,286, filed on Apr. 9, 1999, now abandoned, the entire content of which is hereby incorporated by reference.

TECHNICAL FIELD

This invention relates to an air separation plant integrated with another process. Work is recovered from the nitrogen enriched stream produced by the air separation either by expanding the nitrogen enriched stream directly or by combustion of the nitrogen enriched stream with a fuel stream and expanding gas produced by the combustion. The present invention is related to an integrated power generation system process and apparatus in which a nitrogen enriched stream from an air separation unit is sent to a point upstream of the expander of a gas turbine.

BACKGROUND OF THE INVENTION

Such integrated systems are well known. For example, EP-A-0622535 discloses an integrated power generation system in which nitrogen from an air separation unit is mixed with air and the mixture is sent to the compressor of a gas turbine and subsequently to the combustor. The nitrogen is cooled by expansion or addition of water before the mixing step to increase the gas throughput in the compressor.

EP-A-0538118 describes mixing nitrogen and compressed air from the air compressor before sending the mixture to the combustor of a gas turbine.

In U.S. Pat. No. 5,076,837, a nitrogen stream is heated using a waste gas stream before being expanded in a turbine. The waste gas stream is produced by a chemical process using oxygen from the air separation unit.

EP-A-0225864 uses combustion gases to preheat nitrogen from an adsorption process before expanding the nitrogen in a turbine.

U.S. Pat. No. 4,785,621 discloses an air compressor which produces two air streams, one of which is sent to an air separation unit. The other air stream is mixed with the nitrogen produced by the air separation, warmed using waste heat from a fired gas turbine and subsequently expanded in a turbine.

JP-A-57183529 and JP-A-57083636 describe a coal gasification power plant in which nitrogen from an air separation unit is mixed with air, compressed and sent to a combustor to produce combustion gas.

In U.S. Pat. No. 3,731,495 air from a gas turbine compressor is divided in three. One part feeds an air separation unit producing impure nitrogen, one part is sent to the combustor and the rest is mixed with the gases from the combustor and the impure nitrogen at a temperature of about 1350° F.

U.S. Pat. No. 4,557,735 shows a similar arrangement in which nitrogen which has served to regenerate the adsorbent beds is sent to the combustor of a gas turbine. In this case, an air stream is mixed with the compressed nitrogen and sent to the combustor.

SUMMARY OF THE INVENTION

According to one aspect of the invention, there is provided an integrated power generation system apparatus comprising an air separation unit, a gas turbine comprising a combustor and an expander, a first compressor, means for sending air from the first compressor to the combustor and to the air separation unit, means for sending a nitrogen enriched stream from the air separation unit to a point upstream of the expander, and means for sending a further gas enriched in a component chosen from the group comprising oxygen, argon and carbon dioxide to a point upstream of the expander.

BRIEF DESCRIPTION OF THE DRAWINGS

The invention will now be described in more detail with reference to the following figures.

DETAILED DESCRIPTION OF THE DRAWINGS

Further optional features of the invention disclosed under the Summary of the Invention include means for mixing the further gas with the nitrogen enriched stream from the air separation unit to form a gaseous mixture, means for sending the gaseous mixture to the input of the expander or means for sending the gaseous mixture to the input of the combustor.

In particular, the apparatus may comprise means for feeding a fluid from the air separation unit to a plant from which the further gas is derived.

The example shows means for sending oxygen from the air separation unit to a reformer and means for deriving a carbon dioxide enriched stream from the synthesis gas produced by the reformer. The carbon dioxide enriched stream is then mixed with the nitrogen enriched stream and heated using the synthesis gas or another gas before being expanded.

According to a further aspect of the invention, there is provided an integrated power generation system apparatus comprising an air separation unit producing gaseous nitrogen enriched stream, a gas turbine comprising a combustor and an expander, means for sending air to the combustor and to the air separation unit, means for mixing gaseous nitrogen enriched stream from the air separation unit and air, means for warming the air and nitrogen enriched stream mixture by indirect heat exchange and means for sending the warmed mixture of air and nitrogen enriched stream from the air separation unit to a point upstream of the expander.

According to a still further aspect of the invention, there is provided a process for generating power using an integrated power generation system apparatus having an air separation unit, a gas turbine comprising a combustor and an expander, comprising the steps of sending air to the combustor and to the air separation unit, sending nitrogen enriched stream from the air separation unit to a point upstream of the expander, and sending a further gas enriched in a component chosen from the group comprising nitrogen, argon and carbon dioxide to a point upstream of the expander.

Optional features of this process include mixing the further gas with the nitrogen from the air separation unit to form a gaseous mixture, sending the gaseous mixture to the input of the expander or sending the gaseous mixture to the input of the combustor.

According to a still further aspect of the invention, there is provided a process in which air is separated to produce at least a nitrogen-enriched stream, comprising the steps of mixing the nitrogen-enriched stream with a stream of compressed air to form an enriched nitrogen air stream, warming the enriched nitrogen air stream by indirect heat exchange, sending air and a fuel gas stream to a combustor to generate a combustion stream, expanding the combustion stream in an expander, and sending the enriched nitrogen air stream to a point upstream of the expander.

In particular, the process may be an integrated gasification combined cycle process in which oxygen from the air separation unit is sent to gasify a carbon containing substance thereby producing fuel for the combustor.

Figure 1:
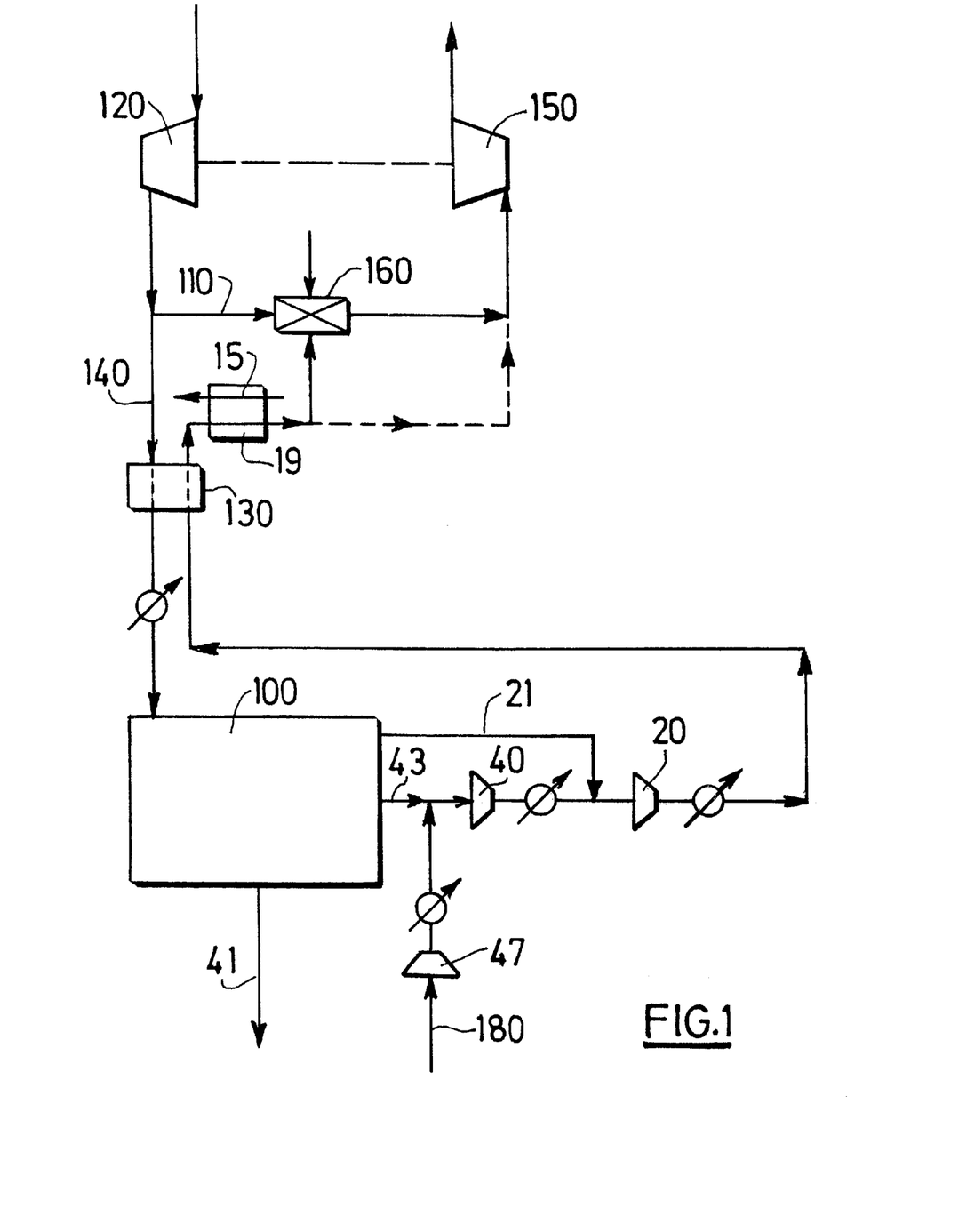
FIGS. 1, 2, 3, 4, 5 and 6 are schematic diagrams of six embodiments of the process of the present invention.

FIG. 1 shows the case where nitrogen is mixed with air to form a nitrogen-enriched air stream, the mixture is then warmed and sent to a point upstream of the expander.

Air is compressed in a compressor 120 of a gas turbine. Part of the air 110 is sent to the combustor 160 and the rest 140 is sent to an air separation unit 100. The air separation unit may also receive air from another independent compressor (not shown). The air separation unit is typically a cryogenic distillation unit comprising two or three thermally linked columns containing trays or structured packings. It may additionally comprise an argon separation column fed from one of the other columns. Alternatively, it may simply comprise a single column.

The air separation unit 100 in the case illustrated produces oxygen enriched stream 41 which may be sent to a coal gasification unit (not shown) and nitrogen enriched streams 21, 43 at two different pressures. An air stream 180 from compressor 47 is mixed with the low pressure nitrogen enriched stream 43, compressed in compressor 40, mixed with the high pressure nitrogen enriched stream 21 and further compressed in compressor 20. It is then cooled and subsequently warmed in heat exchanger 130 against feed air 140 which is cooled in the heat exchanger to a temperature suitable for distillation.

The air stream may alternatively be mixed with the nitrogen enriched stream downstream of compressor 40 or compressor 20.

The mixed stream is then sent to the combustor 160 with the fuel stream. The combustion gases are sent to the expander and are used to generate electricity or drive a compressor.

The mixed stream may alternatively be sent to the input of the expander as shown in dashed line in FIG. 1.

Alternatively the air may be mixed with the nitrogen enriched stream downstream of the warming step.

It may be advantageous to heat the nitrogen enriched stream/air mixture in heat exchanger 19 downstream of heat exchanger 130 by heat exchange with a hot gaseous stream 15 as will be described in further detail below.

In all cases, the air stream may be replaced by a gaseous stream containing at least 50 mol.-% of gaseous oxygen, argon or carbon dioxide or another gas which may be expanded safely in the turbine, preferably at least 60 mol.-% of gaseous oxygen, argon or carbon dioxide, more preferably at least 70 mol.-% of gaseous oxygen, argon or carbon dioxide and still more preferably at least 80 mol.-% of gaseous oxygen, argon or carbon dioxide, for example an impure oxygen stream, an argon stream, a carbon dioxide stream.

In this way, it is possible to make use of a further gas to increase the mass of the stream to be expanded in the gas turbine and thereby increase the power that can be produced.

It will be appreciated that the gaseous nitrogen enriched stream may be withdrawn in gaseous form from the air separation columns or may be withdrawn in liquid form and vaporized against the feed air stream or a nitrogen stream, following an optional pressurization step.

Figure 2:
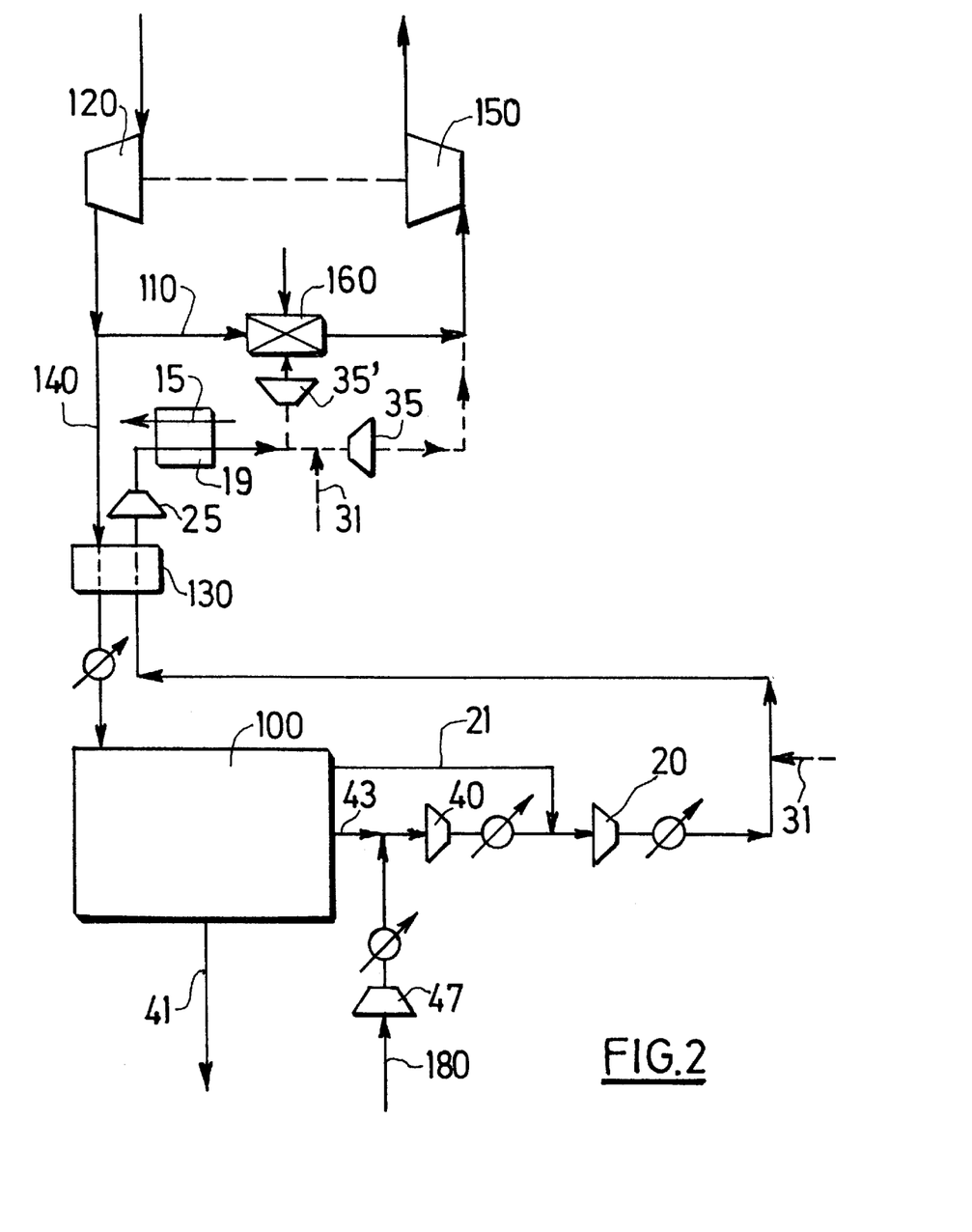

In FIG. 2, a cryogenic air separation unit 1 comprises a double column with a low pressure column operating in a range of from about 5 to about 10 bar (not shown). The nitrogen enriched stream 3 produced by the low pressure column is mixed with a further gas, in this case a gaseous carbon dioxide enriched stream 5 at about the same pressure and compressed in compressor 7 to a pressure in a range of from about 15 to about 80 bar. The nitrogen from the high pressure column is also compressed in compressor 7.

Alternatively a nitrogen enriched stream from the low pressure column may be used.

The double column may be replaced by a single column or a triple column. The air separation unit may also comprise an argon column or a mixing column.

The pure oxygen 9 from the air separation unit 1 is sent to an auto thermal reformer 29 together with natural gas 11 and steam 13.

Synthesis gas 15 is removed from the reformer 29 at a temperature of about 1050° C. and a pressure in a range of from about 20 to about 80 bar.

The synthesis gas is cooled against the mixture 17 of principally nitrogen and carbon dioxide compressed in compressor 7 in a heat exchanger 19 which may be a ceramic heat exchanger or a regenerator.

The synthesis gas is then purified in unit 27 to eliminate the carbon dioxide it contains and at least part of this carbon dioxide is recycled as stream 5 to compressor 7.

The mixture of carbon dioxide and nitrogen at about 1000° C. coming from heat exchanger 19 is expanded in a turbine 21.

The carbon dioxide enriched stream may be replaced by an impure argon enriched stream (at least about 60% argon), an impure oxygen stream (at least about 60% oxygen) or an air stream. Alternatively a mixture of any gases from the group carbon dioxide, impure argon, impure oxygen or air may be added to the nitrogen upstream of the warming step in heat exchanger 19.

The impure argon or oxygen may come from air separation unit 1, another air separation unit or another source.

Preferably the added gases are produced by units consuming a fluid produced by the air separation unit or by the gas turbine.

The additional air may come from the same compressor which compresses air for the air separation unit.

The mixture of nitrogen and the further gas may be the sole feed to the turbine. Alternatively the turbine may be fed by combustion gases from a combustor in addition to the nitrogen mixture.

The mixture may be heated using sources of heat such as slag from a gasifier, blast furnace gas, gas from the expander of a gas turbine, steam, and the like.

In particular the source of heat may be a unit fed by oxygen, argon or nitrogen from the air separation plant which produces a product gas or waste gas at above ambient temperatures and preferably above about 200° C.

The air compressor 2 may also produce air for a fuel combustor.

Figure 3:
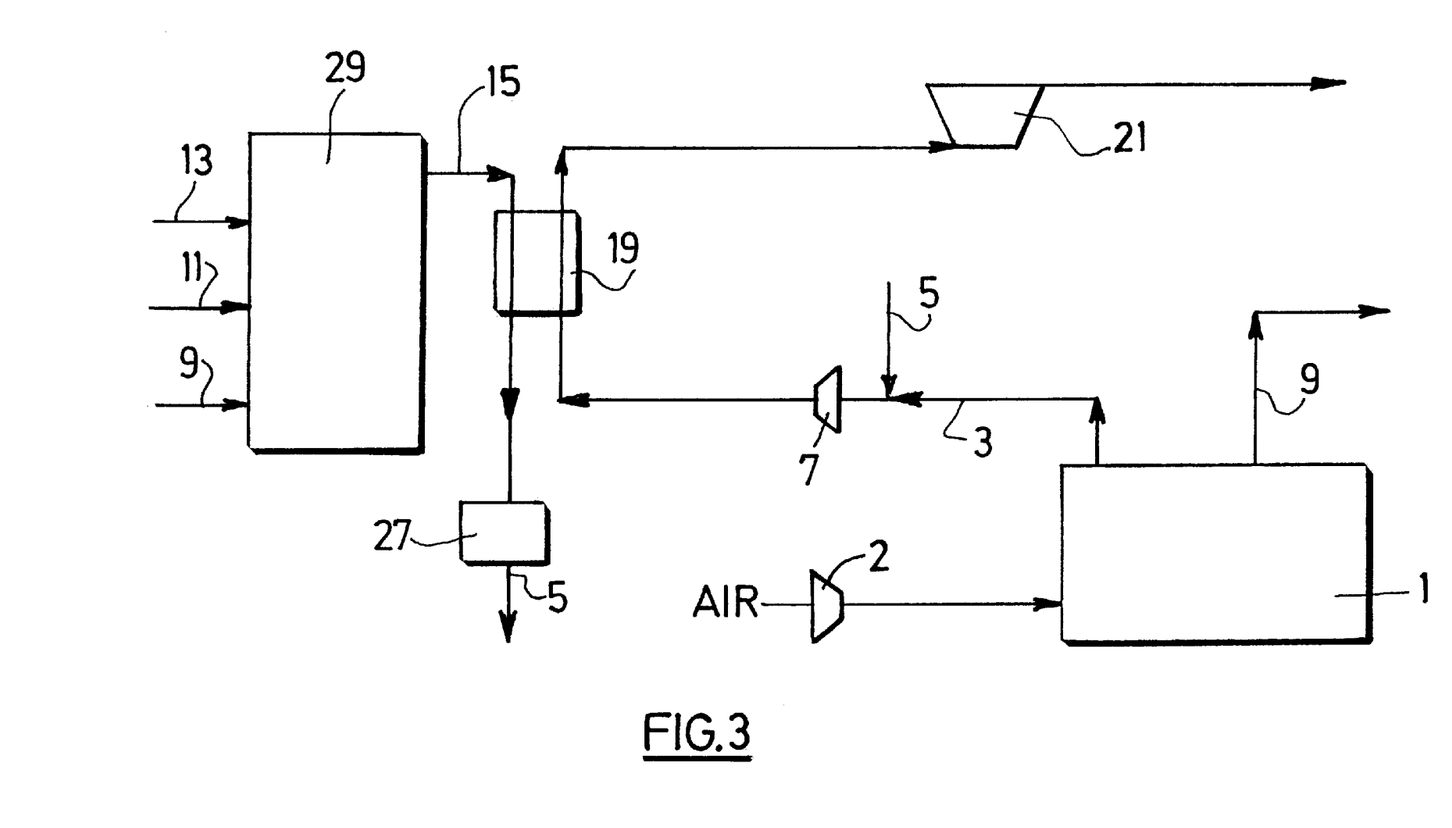
Figure 4:
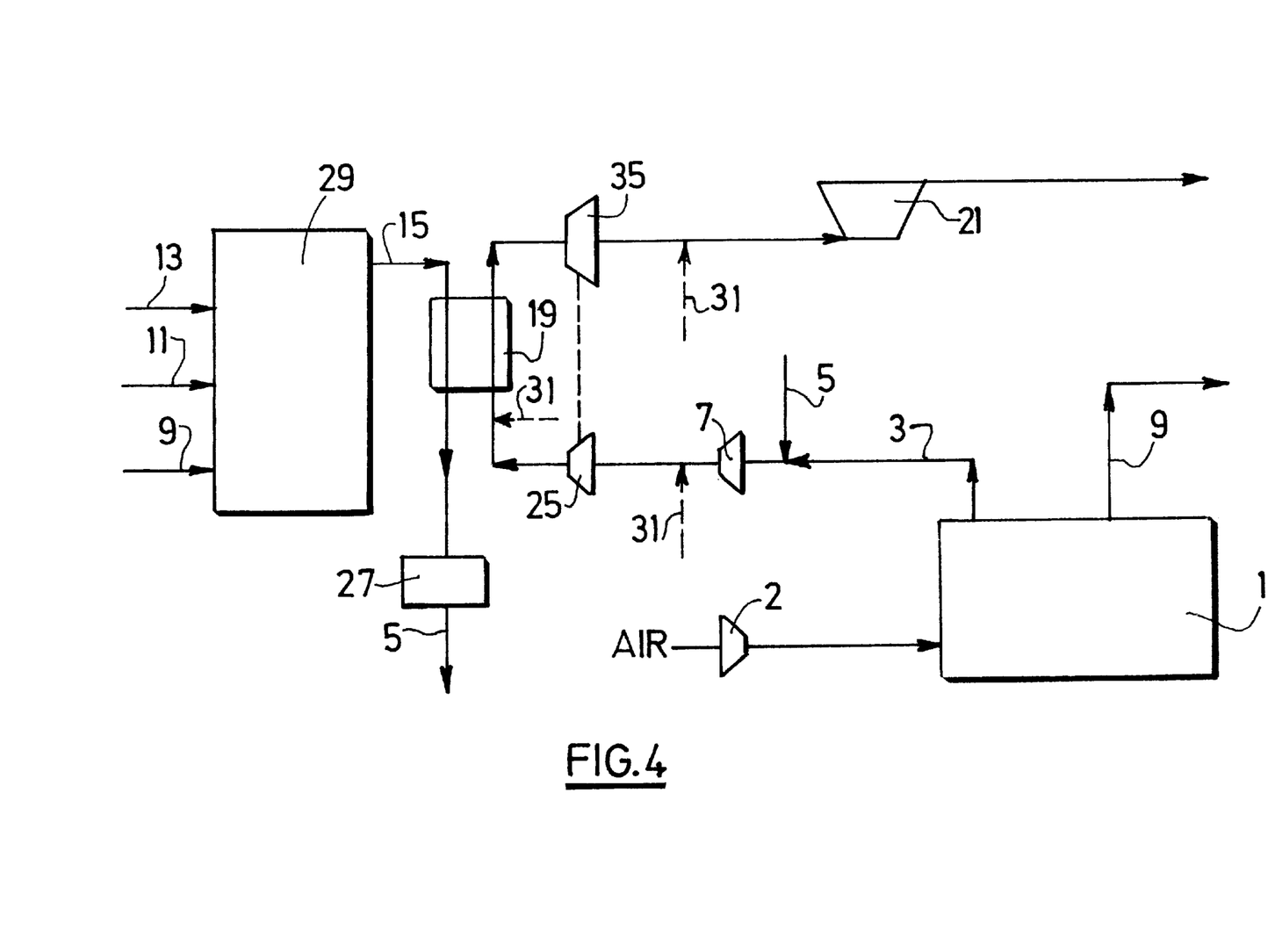
Figure 5:
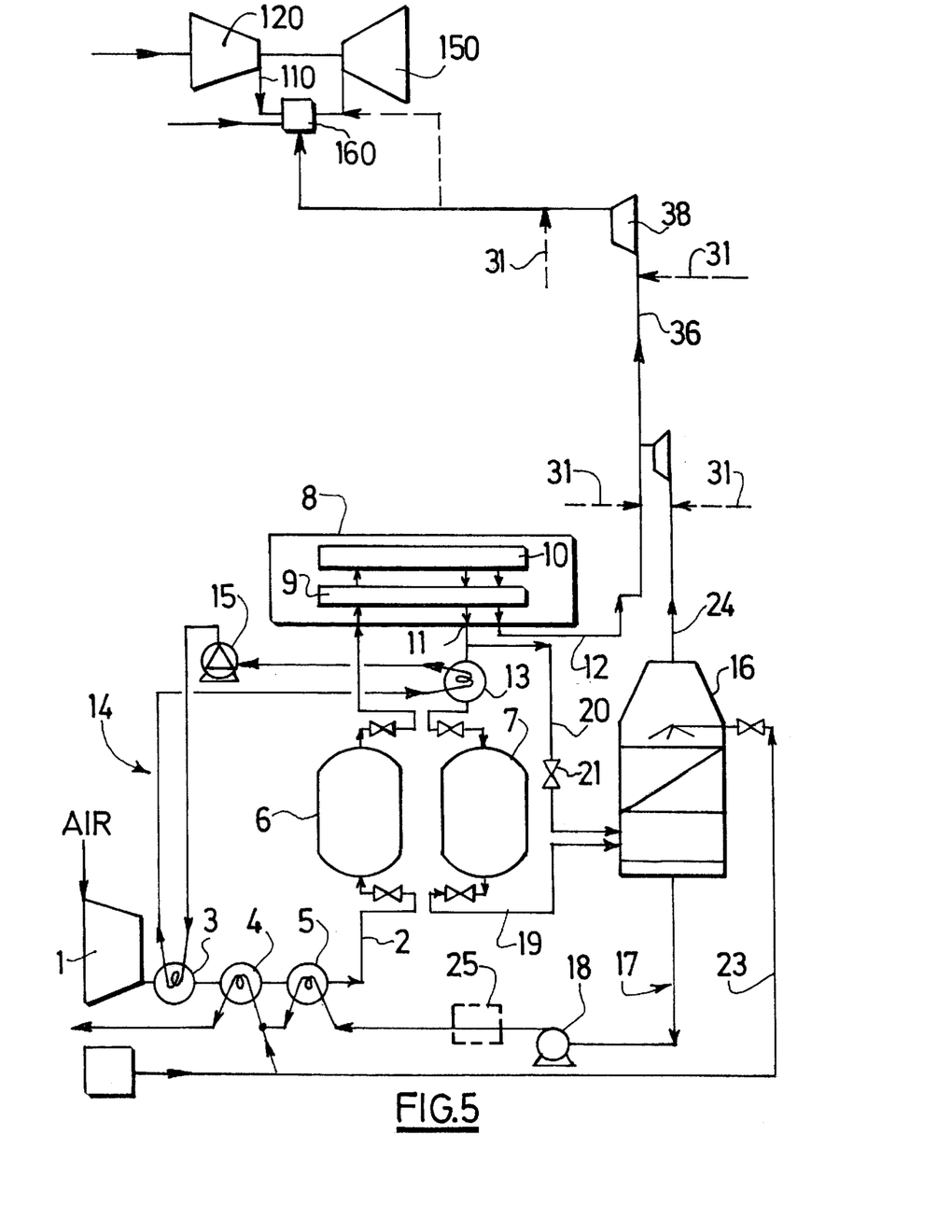
Figure 6:
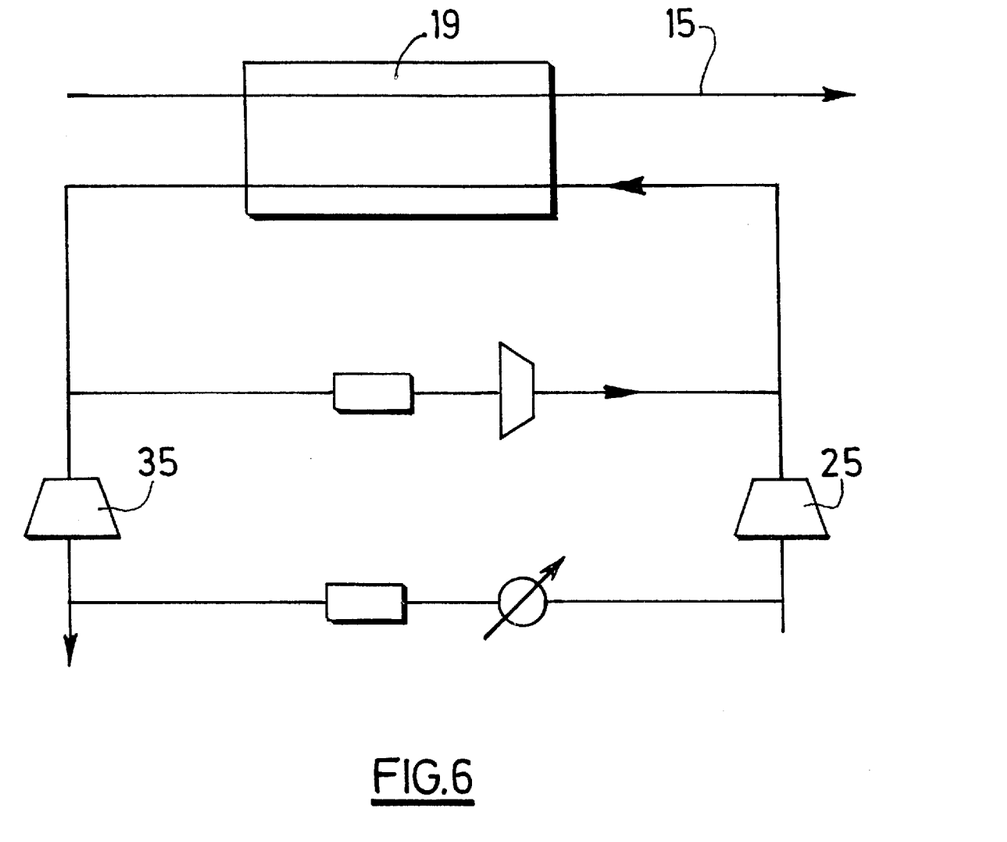

In FIG. 3, there is shown an air separation unit in which compressed air from compressor 1 is cooled by indirect contact with water in heat exchangers 4,5 before being fed to purification beds 6,7, heat exchanger 9 and then to the air distillation apparatus 10. The water 17 is previously cooled in a cooling tower 16 by direct contact with waste nitrogen 19,20 from the air separation unit 10. Nitrogen enriched stream 19 has been used to regenerate the purification beds 6,7. This type of cooling equipment is described in detail in U.S. Pat. No. 5,505,050. At the top of the tower, there is produced a nitrogen stream saturated with water vapor 24 which is mixed with a stream of nitrogen enriched gas 12.

The mixed stream 36 is then compressed in compressor 38 and sent to the combustor 160 of a gas turbine. The combustor is also fed with fuel and compressed air 110 from compressor 120.

Compressor 120 may alternatively supply all or part of the air for the air separation unit.

Dashed lines on the figures show that other gas streams available on the site such as air, steam and/or gas streams containing at least 20 mol.-% nitrogen, argon, oxygen or carbon dioxide may be added at various points of the process.

Preferably the added gases are produced by units consuming a fluid produced by the air separation unit or by the gas turbine.

Preferred processes for practicing the invention, as well as preferred apparatus for such processes, have been described. It will be understood that the foregoing is illustrative only and that other processes and apparatus can be employed without departing from the true scope of the invention defined in the following claims.

What is claimed is:

1. An integrated power generation system apparatus comprising:
   (a) an air separation unit for producing at least a nitrogen-enriched gas stream;
   (b) a gas turbine comprising a combustor and an expander;
   (c) a heat exchanger for cooling air by indirect heat exchange with cooling water;
   (d) means for sending cooled air to the air separation unit;
   (e) means for removing at least first and second nitrogen-enriched gas streams from the air separation unit:
   (f) a cooling tower for placing in direct contact the first nitrogen-enriched gas stream and the cooling water upstream of the heat exchanger;
   (g) means for removing a humidified nitrogen-enriched gas stream from the cooling tower;
   (h) a compressor for compressing the humidified nitrogen-enriched stream;
   (i) means for sending the humidified nitrogen-enriched gas stream from the compressor unit to a point upstream of the combustor,
   (j) means for sending at least one further gas selected from the group consisting of air, a gas containing at least 2 mol. % oxygen, a gas containing of at least 2 mol. % argon, a gas containing at least 10 mol. % carbon dioxide, a gas containing at least 70% nitrogen to the nitrogen-enriched gas stream and combinations thereof to a point upstream of the combustor;
   (k) means for mixing the at least one further gas with the nitrogen-enriched gas stream to form a gaseous mixture;
   (l) means for sending the gaseous mixture to the combustor; and
   (m) means for sending the combustion gases from the combustor to the expander.

2. An apparatus according to claim 1 wherein the at least one further gas contains at least 70 mol. % oxygen.

3. An apparatus according to claim 1 wherein the at least one further gas contains at least 30 mol. % argon.

4. An apparatus according to claim 1 wherein the at least one further gas contains at least 90 mol. % carbon dioxide.

5. An apparatus according to claim 1 wherein the at least one further gas is selected from a gas containing at least 80 mol-% oxygen, a gas containing at least 80 mol. % argon and a gas containing at least 95 mol. % carbon dioxide.

6. An apparatus according to claim 1 wherein the expander is a turbine.

7. An apparatus according to claim 1 comprising means for adding fuel to the gaseous mixture in step (k).

8. An apparatus according to claim 1 comprising a compressor for supplying air to the air separation unit, the combustor or a combination thereof.

9. An apparatus according to claim 1 comprising respective compressors for compressing air for the combustor and the air separation unit.

10. An apparatus according to claim 1 comprising means for warming the nitrogen-enriched gas stream in step (k).

11. An apparatus according to claim 10 wherein the means for warming the nitrogen-enriched gas stream comprise a heat exchanger and means for sending a gaseous product or waste stream from a plant in which an exothermic process takes place.

12. An apparatus according to claim 11 wherein the plant in which the exothermic process takes place is fed by a gas or liquid produced by the air separation unit or compressed air from a compressor.

13. An apparatus according to claim 1 wherein the further gas is air.

14. An apparatus according to claim 1 comprising means for feeding a fluid from the air separation unit to a plant from which the further gas is derived.

15. An apparatus according to claim 14 comprising means for sending an oxygen-enriched stream from the air separation unit to a reformer and means for deriving a carbon dioxide enriched stream from a gas produced by the reformer and means for sending the carbon dioxide enriched gas to the nitrogen-enriched gas stream.

16. An apparatus according to claim 1 wherein the at least one further gas comes from the air separation unit.

17. An integrated air separation process using an air separation unit, a combustor and an expander, comprising the steps of:
   (a) producing at least a nitrogen-enriched gas stream in the air separation unit;
   (b) cooling air by indirect heat exchange with cooling water,
   (c) sending cooled air to the air separation unit;
   (d) removing at least first and second nitrogen-enriched gas streams from the air separation unit;
   (e) contacting the first nitrogen-enriched gas stream and the cooling water upstream of the heat exchanger in a cooling tower;
   (f) removing a humidified nitrogen-enriched gas stream from the cooling tower;
   (g) compressing the humidified nitrogen-enriched stream in a compressor unit;
   (h) sending the humidified nitrogen-enriched gas stream from the compressor unit to a point upstream of the combustor;
   (i) sending at least one further gas selected from the group consisting of air, a gas containing at least 2 mol.% oxygen, a gas containing of at least 2 mol. % argon, a gas containing at least 10 mol. % carbon dioxide, a gas containing at least 70% nitrogen to the nitrogen-enriched gas stream and combinations thereof to a point upstream of the combustor:

(j) mixing the at least one further gas with the nitrogen-enriched gas stream to form a gaseous mixture:

(k) sending the gaseous mixture to the combustor; and (l) sending the combustion gases from the combustor to the expander.

* * * * *